3,457,162
PRODUCTION OF JET FUEL
Fredrick J. Riedl, Arlington Heights, and George R. Donaldson, Barrington, Ill., assignors to Universal Oil Products Company, Des Plaines, Ill., a corporation of Delaware
No Drawing. Filed June 30, 1967, Ser. No. 650,180
Int. Cl. C10g 23/04, 13/10
U.S. Cl. 208—143                                     8 Claims

ABSTRACT OF THE DISCLOSURE

A process for producing paraffin-rich jet fuel from a cyclic hydrocarbon-rich charge stock. The process is conducted catalytically in contact with a fluoride-free catalytic composite of a platinum-group metallic component, a refractory inorganic oxide carrier material and combined chloride, the latter being the sole halogen component of the catalyst. One feature involves the pre-reduction/drying of the catalyst in hydrogen at a temperature above about 1000° F.

BACKGROUND OF THE INVENTION

The present invention provides a process for the conversion of cyclic hydrocarbons into paraffinic hydrocarbons through the utilization of particular conditions of operation, and a particular catalytic composite. The present invention affords unexpected advantages in the production of jet fuel hydrocarbon fractions, through the utilization of a fluoride-free composite of a platinum-group metallic component, a refractory inorganic oxide carrier material and combined chloride, the latter being the sole halogen component of said composite.

Various catalytic reforming processes have attained extensive commercial utility in industries such as the chemical, petrochemical, and particularly within the petroleum industry for converting hydrocarbons and mixtures of hydrocarbons into hydrocarbon fractions and distillates having greater utility. Generally speaking, these reforming processes involve a multitude of reactions among which are hydrogenation, cyclization, cracking, dehydrogenation, alkylation, hydrocracking, and isomerization, etc. For example, during a process for the reforming of hydrocarbons, three major reactions are encountered, in addition to other concomitant reactions occurring to a somewhat lesser degree. It is desirable to effect a proper balance among reactions designed (1) to dehydrogenate the naphthenic hydrocarbons to produce aromatics, (2) to dehydrocyclize the straight-chain paraffinic hydrocarbons to form aromatics, and (3) to effect a controlled type of hydrocracking which is selective both in quality and quantity. Relatively recent developments have shown that reforming processes are more advantageously effected through the utilization of a catalytic composite comprising at least one platinum-group metallic component. Although the prior art abounds in a multitude of such catalytic composites, and teaches a wide variety of methods employed in the manufacture thereof, the precise mechanism of catalysis in a given situation is not fully understood, and the ultimate results of any reforming process, utilizing a particular catalyst and a given charge stock, continue to be difficult to predict with any degree of accuracy.

The quality of jet fuel mixtures is determined primarily by the luminosity number and the heating value of the mixture. At the present time, the most important factor is the luminosity number, being that characteristic of jet fuel which is related to the molecular structure of the hydrocarbons present therein, in that a low luminosity number indicates an excessively luminous flame. The luminosity number is, in part, dependent upon the hydrogen to carbon ratio of the hydrocarbon mixture, and low hydrogen to carbon ratios are unfavorable from the standpoint of a correspondingly low luminosity number. Aromatic hydrocarbons are thus the poorest of jet fuels, and, as the number of condensed rings is increased within the molecule, the fuel becomes even poorer. Thus, based upon hydrogen to carbon ratios only, paraffinic hydrocarbons make the best jet fuel, naphthenes and olefins are next in quality, and aromatics tend to affect detrimentally the luminosity number. Furthermore, the less-branched hydrocarbons indicate a better luminosity number than the more highly branched hydrocarbons. The latter results, possibly, fom a locally low hydrogen to hydrocarbon ratio in a part of the molecule; thus, normal paraffins appear to be slightly better, in regard to luminosity numbers, than branched-chain paraffins.

It is, therefore, readily apparent that, to obtain a jet fuel component of high luminosity number, the product effluent must consist principally of normal and slightly-branched paraffins. Such a product is not readily available in the natural state, and must be synthesized. The desired reaction, as hereinabove set forth, is indicated by the following chemical equations, wherein the naphthenic rings are broken to produce a slightly branched paraffinic material.

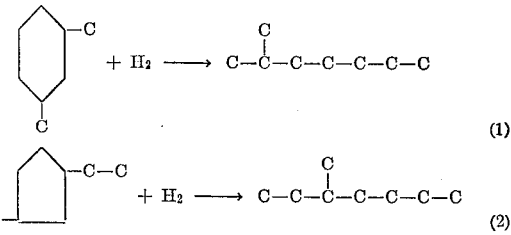

Since the greater proportion of hydrocarbon fractions and/or hydrocarbon distillates contain a significant quantity of aromatic hydrocarbons, such as benzene, toluene and xylene, it is desirable to effect the hydrogenation thereof to form cycloparaffinic hydrocarbons, followed by the virtually simultaneous ring-opening of the cycloparaffinic hydrocarbons. This is contrary to the prior understanding of the catalytic reforming process and the platinum-halogen composites employed therein. Rather than effect the dehydrogenation of naphthenes, and/or the dehydrocyclization of paraffins, both of which are hydrogen-producing, as taught in the prior art, the operating conditions and catalytic composite utilized in the present process effect the advantageous converson of aromatic hydrocarbons to form paraffinic hydrocarbons. These simultaneous reactions may be represented by the following:

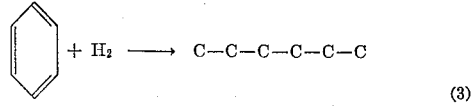

The ring-opening reactions illustrated above are effected in competition with other reactions wherein the paraffins, either formed or present within the feed, undergo a normal hydrocracking reaction to produce lower-boiling hydrocarbons, such as methane, ethane, propane, and butane. This is illustrated by the following:

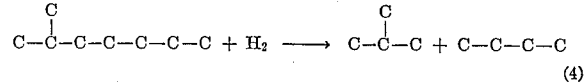

The hydrocracking reactions of this nature are undesirable in that the ultimate yield of acceptable jet fuel components is substantially reduced as a result of the production of an excessive quantity of these light paraffinic hydrocarbons. We have found that the ring-opening reaction can be effected with relatively minor loss to the lower-boiling material under certain conditions of operations, and in the presence of a particular catalytic composite which has been prepared in accordance with a particular method of manufacture.

OBJECTS AND EMBODIMENTS

An object of our invention is the conversion of cyclic hydrocarbons to paraffinic hydrocarbons.

Another object is to provide a catalyst of a platinum-group metallic component which is capable of hydrogenating aromatic hydrocarbons and of effecting ring-opening of naphthenic hydrocarbons.

The primary object of the present invention is to improve the process of reforming hydrocarbons and mixtures of hydrocarbons in order to produce a final product possessing the physical and chemical characteristics required of jet fuel hydrocarbon fractions. A related object of the present invention is to provide a method for manufacturing a particular catalyst for use in the reforming of hydrocarbons for the production of such jet fuel components, which catalyst possesses an exceedingly high degree of selectivity in promoting particularly desirable reactions, while simultaneously inhibiting those reactions which would have the detrimental effect of producing components not suitable for utilization as jet fuel.

Therefore, in a broad embodiment, the present invention provides a process for the conversion of cyclic hydrocarbons into paraffinic hydrocarbons, which process comprises contacting a mixture of hydrogen and a cyclic hydrocarbon, at reaction conditions of a pressure in excess of 1000 pounds per square inch and at a temperature less than about 400° C., with a catalytic composite of platinum-group metallic component, a refractory inorganic oxide carrier material and a combined chloride, separating the resulting reaction products to provide a hydrogen-rich recycle gas stream and recovering normally liquid paraffinic hydrocarbons; said process further characterized in that said catalytic composite is pre-reduced and dried in hydrogen at a temperature above 1000° F.

Another embodiment of the present invetnion relates to a process for the conversion of aromatic hydrocarbons into paraffinic hydrocarbons which comprises contacting an aromatic hydrocarbon and hydrogen, at reaction conditions of a pressure within the range of from about 1000 to about 2500 pounds per square inch and at a temperature of from about 300° C. to about 400° C., with a catalytic composite of a platinum-group metallic component, a refractory inorganic oxide carrier material and combined chlorides, separating the resulting reaction products to provide a hydrogen-rich recycle gas stream and recovering normally liquid paraffinic hydrocarbons; said process further characterized in that said catalytic composite is pre-reduced and dried in hydrogen at a temperature above 1000° F.

A more limited embodiment of the present invention is directed toward a process for the production of a jet fuel hydrocarbon fraction which comprises passing a mixture of hydrogen and a hydrocarbon charge containing cyclic hydrocarbons into a reaction zone, maintained under a pressure within the range of from about 1000 to about 2500 pounds per square inch, and containing a fluoride-free catalytic composite of alumina, from about 0.01% to about 2.0% by weight of platinum and combined chloride in an amount of from about 0.75% to about 1.5% by weight, calculated as the element, separating the resultant reaction zone effluent to remove unreacted cyclic hydrocarbons and hydrogen, recycling said cyclic hydrocarbons and hydrogen to combine with the aforesaid mixture and recovering a jet fuel fraction containing paraffinic hydrocarbons; the process being further characterized in that said catalytic composite is pre-reduced and dried in hydrogen at a temperature above 1000° F.

From the foregoing embodiments, it is seen that the process of the present invention utilizes a catalytic composite of a platinum-group metallic component, a refractory inorganic oxide and a halogen, the latter being limited to combined chloride, to produce a suitable jet fuel hydrocarbon fraction. It is recognized that the prior art relating to the catalytic reforming of hydrocarbons is replete with descriptions of a multitude of such catalysts for utilization therein, and further that the halogen may be selected from a group of fluorine, chlorine, bromine, and iodine. The prior art acknowledges that the utilization of halogen, in some combined form, with the other components of the catalytic composite, imparts a particular acid-acting function to the catalyst, whereby the same exhibits the tendency to promote hydrocracking to a certain degree. For the most part, the various members of the halogen family are treated as being equivalent for this purpose, and it is especially acknowledged that fluorine, chlorine and mixtures thereof may be employed with substantially equal success. To the contrary, we have found that the various members of the halogen family are not equivalent for the purpose of effecting the ring-opening of cyclic hydrocarbons, for the purpose of producing jet fuel components; that there appears to be a certain degree of criticality attached to the concentration of combined halogen within the catalyst; and that the particular halogen employed to effect this reaction is extremely important. As hereinafter indicated, fluorine is not equivalent to chlorine, a mixture of chlorine and fluorine is not equivalent to chlorine, and the exclusion of fluorine coupled with a particular method of manufacture, wherein the composite is prereduced and dried in hydrogen at a temperature above about 1000° F., yields a catalytic composite having an unusual degree of activity and stability with respect to the ring-opening of cyclic hydrocarbons, and to the exclusion of a detrimental degree of hydrocracking. The catalyst employed in the present process appears to be extremely selective in converting the cyclic hydrocarbons into paraffinic hydrocarbons, the latter being essential to the production of an acceptable jet fuel hydrocarbon fraction.

SUMMARY OF INVENTION

As hereinabove set forth, the process of the present invention utilizes a catalyst containing a platinum-group metallic component. Although the process of the present invention is specifically directed toward the utilization of a composite containing platinum, it is intended to include other platinum-group metals such as palladium, rhodium, ruthenium, osmium, and iridium, and mixtures thereof. It is understood that the benefits afforded to processes utilizing catalysts containing different metallic components are not equivalent, and that the effects of the present invention with a particular metallic component, or mixture of metallic components, or a mixture of various compounds thereof, are not necessarily the same effects observed in regard to the use of the other metallic components, or mixtures of metallic components. Generally, the amount of the metallic component composited with the catalyst is small compared to the quantities of the other components combined therewith. For example, platinum and/or palladium, or other metals from the platinum-group will comprise from about 0.01% to about 5.0% by weight of the total catalyst, and usually from about 0.1% to about 2.0% by weight. Whatever the metallic component, it is generally composited with a highly refractory inorganic oxide such as alumina, silica, zirconia, magnesia, boria, thoria, titania, strontia, etc., and mixtures of two or more including silica-alumina, alumina-boria, silica-thoria, silica-alumina-zirconia, etc.

It is understood that the refractory inorganic oxides hereinabove set forth are intended to be illustrative rather than limiting unduly the present invention. It is further understood that these refractory inorganic oxides may be prepared by any suitable method including separate, successive, or co-precipitation means of manufacture, or they may be naturally-occurring substances such as clays or earths which may be or may not be purified or activated with special treatment. The preferred refractory inorganic oxide, for utilization in the process of the present invention, comprises alumina, either in admixture with other of the aforementioned refractory oxides, or as the sole component of the refractory material selected to serve as the carrier for the active catalytic components. In one of the more limited embodiments of the present invention, relating to the method of preparing the catalytic composite for use in the conversion of cyclic hydrocarbons to paraffinic hydrocarbons, the alumina is synthetically prepared and subjected to a particular calcination procedure employed to facilitate the deposition of the platinum-group component and the combined chloride therewith.

Alumina may be prepared by adding a suitable alkaline reagent, such as ammonium hydroxide, to a salt of aluminum such as aluminum chloride, aluminum nitrate, etc., in an amount to form aluminum hydroxide which, upon drying, is converted to alumina. The alumina may be formed into any desired shape such as spheres, pills, extrudates, powder, granules, etc. The particularly preferred form of alumina is the sphere, and alumina spheres may be continuously manufactured by passing droplets of an alumina hydrosol into an oil bath maintained at an elevated temperature. Following a drying procedure, at a temperature within the range of from about 200° F. to about 400° F., to remove the greater proportion of excessive moisture therefrom, the alumina spheres are subjected to a specific calcination procedure which appears to result in surface and structural characteristics whereby the alumina is more susceptible to the thorough penetration, and more permanent deposition of the other catalytic components. The dried alumina is calcined initially at a temperature of from about 850° F. to about 1050° F. for a period of at least about one hour, and thereafter at an elevated temperature of about 1100° F. to about 1400° F., for a time sufficient to decrease the volatile matter content of the calcined alumina to a level below about 2.0% by weight.

With respect to reforming catalysts comprising a platinum-group metallic component and halogen, the prior art teaches that the halogen is generally composited with the catalyst in concentrations within the range of about 0.01% to about 8.0% by weight of the total catalyst, and that such halogen may be either fluorine, chlorine, iodine, bromine, or mixtures thereof. It is further disclosed in the prior art that fluorine and chlorine, and particularly fluorine, are less easily removed from the catalytic composite during the manufacture thereof, and further during the process in which the catalyst is employed; for this reason, fluorine, or a mixture of chlorine and fluorine, is the particularly preferred halogen component. To the contrary, we have found that the halogen may be composited with the catalyst in such a manner that it is not readily removed from the catalyst during processing, and further that benefits are afforded the process of reforming hydrocarbons to produce jet fuels when such halogen consists solely of combined chloride, and the composite is pre-reduced and dried in hydrogen at a temperature above 1000° F.

The chloride may be added to the calcined carrier material, such as alumia, in any suitable manner, and either before, or after the addition of the catalytically active metallic components. The chloride may be added as an aqueous solution of hydrogen chloride, as aluminum chloride, or through the utilization of a volatile salt such as ammonium chloride. We prefer to composite the chloride with the alumina during the impregnation of the latter with the active metallic component, for example, through the utilization of chloroplatinic acid, ammonium chloroplatinate, chloroplatinous acid, etc., in admixture with hydrochloric acid. The treatment of the carrier material following the deposition of the platinum-metallic component and the chloride, is very important to achieving advantageous results. As in the preparation of the alumina, this treatment is concerned with the method of subjecting the composite to a specific calcination procedure, followed essentially by reduction. Thus, the composite is oxidized, or calcined, initially at a temperature within the range of from about 400° F. to about 600° F. until the volatile matter content thereof is decreased to a level below about 5% by weight. The calcination temperature is then increased to a level within the range of from about 700° F. to about 1000° F., and the composite further calcined at the elevated temperature until the volatile matter content of the final catalytic composite is decreased to a level below about 2.0% by weight. The temperature is then increased to a level above about 1000° F. (say from 550° C. to about 650° C.), the upper limit being about 1200° F. While the temperature is being raised, nitrogen or other suitable inert gas is employed to "sweep" the composite free from oxygen. Hydrogen is recycled through the catalyst at the elevated temperature for a period of from two to about ten hours. Although the precise effect of this particular calcination/reduction drying procedure is not accurately known, it is believed that the greater proportion of the chlorine component is caused to combine with the alumina and platinum-group metallic component in such a manner that it is not easily removed from the catalyst during processing. Generally, reforming catalysts of this type are manufactured to contain about 0.35% by weight of chlorine, and about 0.35% by weight of fluorine. Following the period of operation during which the catalyst is subjected to a liquid charge under elevated temperature and pressure, it is found that the greater proportion of the chlorine component has been removed. Several disadvantages inherently result after the chlorine component has been removed from the catalyst. These disadvantages also appear to be inherent when the catalytic composite originally contains only combined fluoride as the halogen component. The fluorine component apparently results in a greater degree of undesirable hydrocracking, and further appears to be more sensitive to the severe conditions encountered when operating at elevated temperatures and pressures. In following the catalyst manufacturing procdure hereinafter set forth, the reforming catalyst has composited therewith combined chloride in an amount of from 0.75% to about 1.5% by weight, calculated as elemental chlorine, and being the sole halogen component of the catalytic composite. As hereinafter indicated, this particular catalyst has an unusually high degree of activity in regard to the production of jet fuel components from a hydrocarbon fraction containing a predominant quantity of cyclic hydrocarbons.

The process of the present invention may be effected in any suitable equipment, and it is particularly preferred to utilize the well-known, fixed-bed system in which the catalyst is disposed in a reaction zone, and the hydrocarbons are passed therethrough in upward flow, downward flow or radial flow. The total reaction zone effluent is passed into a separation zone for the purpose of separating a hydrogen-rich gas stream which is recycled to combine with the fresh hydrocarbon charge to the reaction zone. The light paraffinic hydrocarbons, methane, ethane, propane and butane, are removed from the normally liquid product effluent in a suitable fractionation or distillation zone. Any unreacted cyclic hydrocarbons, remaining in the liquid product stream, may be removed therefrom and recycled to combine with the original hydrocarbon charge and hydrogen. Other suitable units, in which the process of the present invention may be effected, include the fluidized-bed process in which the hydrocarbons and catalysts are maintained in a state of turbulence, under hindered settling conditions; the fluidized-fixed bed type process, wherein the catalyst is not withdrawn from the reaction zone as in the fluidized-bed process; the compact moving bed type in which the catalyst and hydrocarbons are passed either concurrently or counter-currently to each other, and the suspensoid type of operation in which the catalyst is carried into the reaction zone as a slurry in admixture with the hydrocarbon feed.

The hydrocarbon charge, containing cyclic hydrocarbons, is passed into the reaction zone at a liquid hourly space velocity (defined as volumes of hydrocarbon charge per hour per volume of catalyst within the reaction zone), of from about 0.5 to about 10.0. Lower, and intermediate, space velocities are preferred and will generally lie within the range of from about 1.0 to about 3.0. As hereinabove set forth, a hydrogen-rich gas stream is recycled to combine with the fresh hydrocarbon charge. The hydrogen will be recycled in an amount sufficient to result in a hydrogen to hydrocarbon molal ratio of from about 4:1 to about 50:1. In view of the comparatively high pressures, at which the process of the present invention is effected, lesser quantities of hydrogen are preferred in order to ease the load placed upon the equipment employed in recycling such a gas stream; thus, it is preferred to employ hydrogen recycle in an amount to yield a hydrogen to hydrocarbon molal ratio within the range of about 6:1 to about 15:1. As hereinafter indicated, in specific examples, the reaction zone is maintained under an imposed pressure in excess of about 1000 pounds per square inch, having an upper limit of about 2500 pounds per square inch. At pressures below about 1000 pounds per square inch, the reaction zone effluent does not contain a sufficient quantity of paraffinic hydrocarbons necessary to meet the luminosity number specification, notwithstanding the fact that there is effected a considerable amount of ring-opening at the lower pressures. The temperature at which the catalyst is maintained must necessarily be controlled within particular limits in order to avoid a temperature run-away which inherently results in an excessive degree of hydrocracking of the paraffinic hydrocarbons into the light paraffinic gaseous material, methane, ethane, propane and butane. On the other hand, the temperature must be such that sufficient ring-opening is effected to meet, or exceed the specification in regard to luminosity number. It has been found that the catalyst should be maintained at a temperature within the range of from about 300° C. to about 400° C., at which temperature unusually high volumetric yields of a product possessing the required luminosity number are produced. The charge stock to the reaction zone may be a straight-run gasoline, thermally or catalytically-cracked gasoline, light or heavy naphtha fractions, or mixture thereof. Generally, the boiling range of the charge stock will be from about 125° F. to about 430° F., although heart-cut distillates having a boiling range of from about 200° F. to about 350° F., or in some instances up to about 450° F., may be employed. Prior to entering the reaction zone, the hydrocarbon charge may be subjected to a suitable separation to remove normal paraffinic hydrocarbons therefrom. The use of molecular sieves is extremely advantageous for this purpose, resulting in a substantially denormalized hydrocarbon fraction.

Since the process of the present invention, for the production of jet fuel components, utilizes essentially a combination of hydrocracking and hydrogenation reactions, that is, effects the ring-opening of cyclic hydrocarbons while simultaneously hydrogenating the same to produce straight-chain and slightly branched-chain paraffinic hydrocarbons, one might expect a catalyst known to possess both hydrocracking and hydrogenation activity to be suitable for utilization herein. Such catalyst are indicated in the prior art as containing one or more metals selected from Group VI-A and the Iron-Group of the Periodic Table. Thus, these catalysts generally comprise one or more of the following metallic components: Chromium, molybdenum, tungsten, iron, cobalt, and/or nickel. A well-known hydrogenation catalyst possessing hydrocracking propensities is a nickle-kieselguhr catalyst comprising about 50.0% by weight of nickel. As hereinafter indicated, in a specific example, such catalyst are not in fact suitable for utilization in the present process. When such catalysts are employed, the temperature of the operation, required to produce a high degree of ring-opening, is such that a temperature-run-away is experienced with the inherent result that excessive quantities of the light paraffinic hydrocarbons are produced, and the catalyst becomes deactivated through the deposition of excessive quantities of coke and other carbonaceous material. At temperatures above 300° C., the demethylation reaction becomes prominent and effects the deposition of the carbonaceous material which shields the active surfaces and centers of the catalyst from the materials being processed.

Examples

The following examples are given to illustrate the method of preparing the catalyst for utilization in the process of the present invention, and to indicate the benefits afforded through the utilization thereof in producing a jet fuel hydrocarbon fraction having a suitable, and exceedingly high luminosity number.

Example I

This example is given to illustrate the inadequacy of a typical hydrocracking/hydrogenation catalyst for utilization in the process of the present invention. The catalyst employed in this example was a nickel-kieselguhr catalyst in the form of ⅛-inch cylindrical pills, having composited therewith 55.5% by weight of nickel. The reaction zone was maintained at a pressure of 500 pounds per square inch, the space velocity was 2.0, and the hydrogen to hydrocarbon molal ratio was 5:1. The operating temperature was varied between the limits of 200° C. and 425° C., and the results of the various operations are given in the following Table I. The charge stock employed was a denormalized, intermediate naphtha having a boiling range of 221° F. to 351° F., and a specific gravity of 0.7674. The charge stock contained, on a volumetric basis, 31% paraffins, 57% naphthenes and 12% aromatics, there being no olefinic hydrocarbons contained in the charge stock. An initial analysis indicated that the charge stock possessed a luminosity number of 70.

TABLE I.—PRODUCT QUALITY, NICKEL KIESELGUHR CATALYST

| Period number | 1 | 2 | 3 | 4 | 5 | 6 | 7 |
|---|---|---|---|---|---|---|---|
| Operating conditions: | | | | | | | |
| Pressure, p.s.i.g. | 500 | 500 | 500 | 500 | 500 | 520 | 1,000 |
| Temperature, ° C. | 200 | 220 | 260 | 310 | 400 | 300 | 300 |
| Product inspection: | | | | | | | |
| Paraffins, wt. percent | 36 | 35 | 37 | 35 | 33 | 41 | 31 |
| Olefins, wt. percent | | | | | 1 | | |
| Naphthenes, wt. percent | 64 | 65 | 63 | 65 | 53 | 59 | 61 |
| Aromatics, wt. percent | | | | | 13 | | |
| Luminosity number | 98 | 95 | 99 | 102 | 73 | 99 | 100 |

The seven periods of operation indicated in Table I, illustrate the inadequacy of the nickel-kieselguhr catalyst to produce a jet fuel hydrocarbon fraction of suitable luminosity number which should not be lower than 132 in order that a hydrocarbon fraction possess the desired burning characteristics of a suitable jet fuel. As indicated in Table I, as the operating temperature exceeded 300° C., very little ring-opening was effected, and, for all practical purposes, the liquid product effluent was identical to the original hydrocarbon charge stock. Furthermore, increasing temperature had no apparent beneficial effect in raising the luminosity number. It is further noted that an increase in pressure to a level of 1000 pounds per square inch did not improve the operation to the extent of increasing the luminosity number of the liquid product effluent. It is evident that this type catalyst is inapplicable for use in the process of the present invention, in that it does not promote the necessary degree of ring-opening while, at the same time, inhibiting the hydrocracking of the paraffinic hydrocarbons thus formed.

Example II

This example is given for the purpose of illustrating the effect of the operating pressure upon the process of the present invention. The charge stock employed was identical to that utilized in the foregoing Example I, the space velocity was maintained, for the six periods illustrated in Table II, at 1.0 to 1.5 and the hydrogen to hydrocarbon molal ratio at about 10:1. The periods were conducted at each of three different pressure levels, 500, 900 and 2000 pounds per square inch. At each pressure level, the two periods were conducted at different temperature levels; the operating conditions for the six periods are given in the following Table II:

TABLE II.—PRESSURE EFFECT

| Period number | 8 | 9 | 10 | 11 | 12 | 13 |
|---|---|---|---|---|---|---|
| Operating conditions: | | | | | | |
| Pressure, p.s.i.g. | 500 | 500 | 900 | 900 | 2,000 | 2,000 |
| Temperature, °C. | 520 | 370 | 360 | 330 | 325 | 300 |
| Product inspection: | | | | | | |
| Paraffins, wt. percent | 38 | 45 | 65 | 50 | 85 | 69 |
| Olefins, wt. percent | 0 | 0 | 0 | 0 | 0 | 0 |
| Naphthenes, wt. percent | 62 | 48 | 35 | 50 | 15 | 31 |
| Aromatics, wt. percent | 0 | 7 | 0 | 0 | 0 | 0 |
| Luminosity number | 99 | 79 | 111 | 105 | 146 | 124 |

The catalyst employed in obtaining the data illustrated in the foregoing Table II was a composite of alumina, 0.375% by weight of platinum, and 4.0% by weight of combined fluoride, calculated as the element thereof. The effect of increasing the pressure to a level in excess of 1000 pounds per square inch, is readily ascertained from the data presented in Table II. At a pressure of 500 pounds per square inch, an increase in temperature from 320° C. to 370° C. resulted in a decrease in luminosity number from 99 to 79, the latter being virtually unchanged from the 70 exhibited by the original charge stock. Furthermore, at 500 pounds pressure and a temperature of 370° C., 7.0% by weight of aromatic hydrocarbons, and 48% by weight of naphthenes were contained in the product effluent. At 900 pounds pressure, there was an increase in the production of paraffinic hydrocarbons, as evidenced by the increase in luminosity number to 111 and 105. The operation effected at 2000 pounds pressure, and a temperature of 325° C., resulted in a product effluent having a luminosity number of 146, and was the only period resulting in a suitable jet fuel hydrocarbon fraction—i.e. luminosity number greater than 132. However, analyses performed for the purpose of obtaining the product distribution, indicated that the presence of fluoride within the catalytic composite resulted in an excessive degree of hydrocracking such that the weight percent of the pentanes and heavier hydrocarbon product was only 77.2% of the original hydrocarbon charge stock. This detrimental effect of fluoride within the catalytic composite, is more clearly illustrated in the following example.

Example III

This example is given for the purpose of comparing the results obtained through the use of catalytic composites containing varying quantities of platinum and varying quantities of combined fluoride and combined chloride. The charge stock employed was a Mid-Continent heavy naphtha containing 56 volume percent cyclic compounds, having a luminosity number of 71. The charge stock had a boiling range from 246° F. to 385° F. The reaction zone in all six periods was maintained at a pressure of 2000 pounds per square inch and a liquid hourly space velocity of 2.0; the hydrogen to hydrocarbon molal ratio was maintained at a level of 10:1, the temperature being varied from 280° C. to 390° C. for the purpose of obtaining final products having varying luminosity numbers, and to vary the degree of hydrocracking being effected within the reaction zone. One of the catalysts evaluated under these conditions contained 0.750% by weight of platinum and 0.90% by weight of combined chloride, calculated as the element, and being the sole halogen component of the composite.

As indicated in the following Table III, the additional catalysts evaluated were composites of alumina with 0.375% by weight of platinum and 4.0% by weight of combined fluoride; 0.750% by weight of platinum, 0.25% by weight of lithium; 0.375% by weight of platinum; 0.750% by weight of platinum, 0.22% by weight of combined chloride. For each of the catalysts tested, graphical plots were made of the quantity of cyclic hydrocarbons in the product effluent, the luminosity number and the quantity of light paraffinic hydrocarbons produced, using temperature as the variable. As indicated in Table III, the catalysts are compared at low levels of hydrocracking; first at a level resulting in 75 standard cubic feet of light paraffinic hydrocarbons per barrel of fresh charge, and secondly at a hydrocracking level of 220 standard cubic feet per barrel of fresh hydrocarbon charge.

TABLE III.—CATALYST EVALUATION

| | At 75 s.c.f./bbl. | | At 220 s.c.f./bbl. | |
|---|---|---|---|---|
| Catalyst | Cyclic | Luminosity | Cyclic | Luminosity |
| 0.375% Pt, 4.0% F | 42 | 107 | 28 | 123 |
| 0.750% Pt, 0.25% Li | 40 | 112 | 29 | 119 |
| 0.375% Pt | 37 | 121 | | |
| 0.750% Pt, 0.22% Cl | 33 | 126 | 16 | 138 |
| 0.750% Pt, 0.90% Cl | 23 | 140 | 7 | 151 |

At the lower hydrocracking level, the only catalyst resulting in a product having a luminosity number in excess of the specification of 132, was the catalyst prepared in accordance with the method of the present invention as hereinabove set forth, with the exception that the high temperature pre-reduction, drying step was omitted. At the higher hydrocracking level, the catalyst containing 0.22% by weight of combined chloride, as the sole halogen component, produced a product having a luminosity number of 136; however, it should be noted that this catalyst necessitated an increase in the severity of the operation which inherently resulted in more hydrocracking, and correspondingly lower volumetric yield.

Example IV

This example is given for the purpose of comparing the results obtained through the use of catalytic composites containing identical quantities of platinum and identical quantities of combined chloride. The charge stock employed was a heavy naphtha which had been hydrogenated, containing 58 volume percent naphthenes and 42 volume percent paraffins; the luminosity number was 100. The charge stock had a boiling range from 245° F. to 369° F. and an average molecular weight of 122. The reaction zones were maintained at a pressure of 2000 pounds per square inch and a liquid hourly space velocity of 1.0; the hydrogen to hydrocarbon molal ratio was maintained at a level of 10:1; the temperature being varied from 280° C. to 390° C. for the purpose of obtaining final products having varying luminosity numbers, and to vary the degree of hydrocracking being effected within the reaction zone. Both of the catalysts evaluated under these conditions contained 0.750% by weight of platinum and 0.90% by weight of combined chloride, calculated as the element, and being the sole halogen component of the composite. These were prepared by forming an aluminum chloride hydrosol into $\frac{1}{16}$-inch spheres by the oil-drop method set forth in U.S. Patent No. 2,620,314, issued to James Hoekstra. The alumina spheres were dried at a temperature of about 400° F., and thereafter calcined, in an atmosphere of air, for a period of about one hour at a temperature of about 950° F. The calcination temperature was then increased to a level of about 1265° F., and the calcination procedure continued at the elevated temperature for a period of about two hours, until the volatile matter content of the alumina spheres had decreased to a level of 1.98% by weight. The calcined alumina spheres were commingled, in a rotating evaporator, with water, hydrochloric acid, and sufficient chloroplatinic acid to result in a final catalytic composite containing 0.750% by weight of platinum. The spheres were dried within the rotating evaporator at a steam pressure of about 50 pounds, for a period of six hours. The dried spheres were then subjected to high-temperature calcination, or oxidation, at a temperature of 550° F. for a period of one hour until the volatile matter content was decreased to about 4.5% by weight. The temperature was then increased to a level of 932° F., and further calcination effected for a period of two hours until the volatile matter content decreased to a level of 1.7% by weight. The final catalytic composite was fuoride-free and contained 0.750% by weight of platinum and 0.90% by weight of combined chloride calculated as the element.

A first portion of the thus-calcined catalyst was then subjected to the final reduction-drying technique at 550° C. (1022° F.), substantially atmospheric pressure, and with 5.0 s.c.f./hr. of hydrogen for a period of five hours. This pre-reduced catalyst is designated as catalyst A in the tabulation hereinafter produced. A second portion of the calcined catalyst was placed in the ⅞-inch (nominal I.D.) reactor, in an amount of 100 cc., and hydrogen circulated at a rate of 5.5 s.c.f./hr., and a temperature of 280° C. (536° F.), the initial temperature at which the naphtha charge is introduced; this catalyst is designated as catalyst B. A total of seven (7) operations was conducted, at the temperature levels indicated in the following Table IV:

TABLE IV.—PRE-REDUCTION EFFECT

| Catalyst designation | Luminosity numbers | |
|---|---|---|
| | A | B |
| Temperature, ° C.: | | |
| 280 | 103 | 104 |
| 300 | 108 | |
| 320 | 114 | 100 |
| 340 | 129 | |
| 350 | 142 | 102 |
| 360 | 151 | |
| 370 | 158 | 109 |

The corresponding concentrations of cyclic hydrocarbons are presented in the following Table V:

TABLE V.—CYCLIC HYDROCARBON CONCENTRATION

| Catalyst designation | Vol. percent cyclics | |
|---|---|---|
| | A | B |
| Temperature, ° C.: | | |
| 280 | 52 | 56 |
| 300 | 46 | |
| 320 | 42 | 55 |
| 340 | 30 | |
| 350 | 24 | 54 |
| 360 | 16 | |
| 370 | 10 | 49 |

After about 98 hours of on-stream processing with the catalyst not pre-reduced (catalyst B), the naphtha charge was stopped and the plant pressure reduced to atmospheric. The catalyst was subjected to hydrogen reduction at 550° C. for five hours, the hydrogen rate being 5.0 s.c.f./hr. At a temperature of 370° C., the charge was re-introduced at the previously specified conditions. Following a "line-out" period, a test sample was taken during the 106–112 hour on-stream period, and indicated a luminosity number of 157 and a cyclic concentration of 6.0 volume percent. A second sample at the 124–136 hour on-stream period indicated a luminosity number of 161 and a cyclic concentration of only 8.0 volume percent.

The foregoing specification and examples illustrate the process of the present invention as designed to produce a jet fuel hydrocarbon fraction, and clearly describe the method for the preparation of the catalytic composite for utilization therein. It is not intended, however, that the present invention be unduly limited beyond the scope and spirit of the appended claims by any of the conditions, concentrations or reagents employed in presenting the illustrative examples.

We claim as our invention:

1. A process for the production of jet fuel from a hydrocarbon charge stock having a boiling range within the limits of from about 125° F. to about 450° F. and containing a substantial proportion of cyclic hydrocarbons which comprises contacting said charge stock and hydrogen with a catalytic composite of a refractory inorganic oxide, from about 0.01% to about 5.0% by weight of a platinum-group metallic component and combined chloride in an amount of from about 0.75% to about 1.5% by weight, calculated as elemental chlorine, said chlorine being the sole halogen component of said catalytic composite, at reaction conditions including a temperature of from about 300° to about 400° C., a pressure substantially in excess of 1000 pounds per square inch, a liquid hourly space velocity of from about 0.5 to about 10 and a hydrogen to hydrocarbon molal ratio of from about 4:1 to about 50:1, and correlating said conditions to convert the cyclic hydrocarbons to straight-chain and slightly branched-chain paraffins by ring-opening and hydrogenation as the principal reactions in the process; said process further characterized in that said catalytic composite is pre-reduced and dried in hydrogen at a temperature above 1000° F. for a period of from about 2 to about 10 hours.

2. The process of claim 1 further characterized in that said cyclic hydrocarbons comprise a cycloparaffin.

3. The process of claim 1 further characterized in that said cyclic hydrocarbons comprise an aromatic.

4. The process of claim 1 further characterized in that said reaction conditions include a pressure from about 1000 to about 2500 p.s.i.g.

5. The process of claim 1 further characterized in that said catalytic composite comprises platinum.

6. The process of claim 1 further characterized in that said catalytic composite comprises palladium.

7. The process of claim 1 further characterized in that said catalytic composite comprises alumina.

8. The process of claim 1 further characterized in that said platinum-group component is present in the catalytic composite in a concentration of from about 0.1% to about 2% by weight.

References Cited

UNITED STATES PATENTS

| | | | |
|---|---|---|---|
| 2,479,110 | 8/1949 | Haensel | 208—139 |
| 2,945,802 | 7/1960 | Ciapetta et al. | 208—15 |
| 3,150,071 | 9/1964 | Ciapetta et al. | 208—15 |
| 3,173,857 | 3/1965 | Haensel | 208—139 |
| 3,193,490 | 7/1965 | Broughton | 208—139 |
| 3,216,923 | 11/1965 | Haensel | 208—139 |

HERBERT LEVINE, Primary Examiner.

U.S. Cl. X.R.

208—15, 112, 139, 144; 252—442